June 8, 1954            L. CASTERLINE            2,680,801
POULTRY SINGE DEVICE
Filed Nov. 28, 1951                                      2 Sheets-Sheet 1
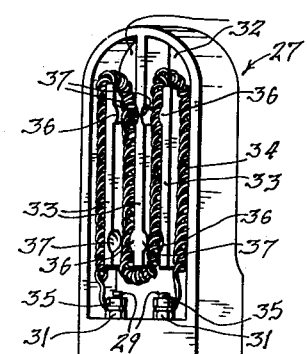
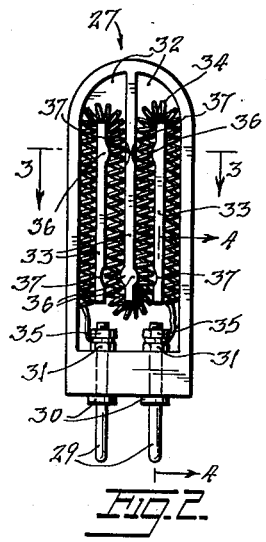
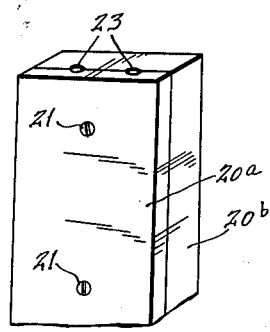
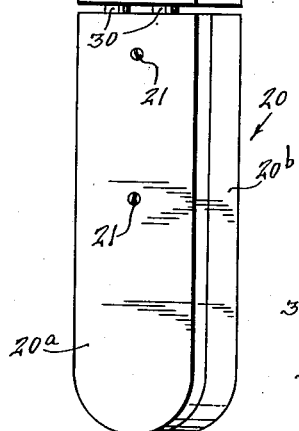
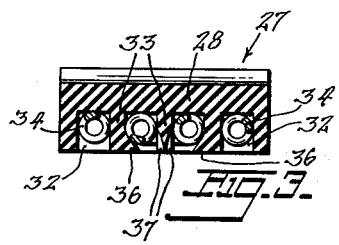
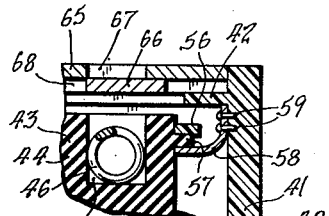
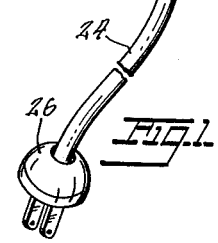
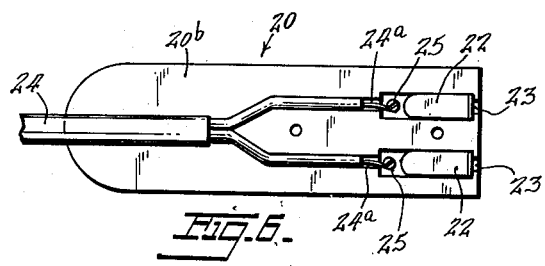
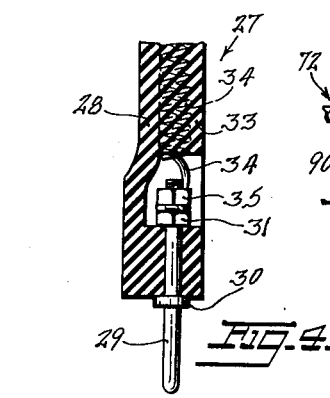
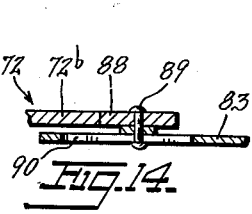
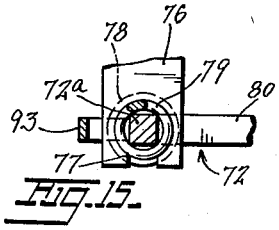
INVENTOR.
LESTER CASTERLINE
BY
ATTORNEY June 8, 1954
L. CASTERLINE
2,680,801
POULTRY SINGE DEVICE
Filed Nov. 28, 1951
2 Sheets-Sheet 2
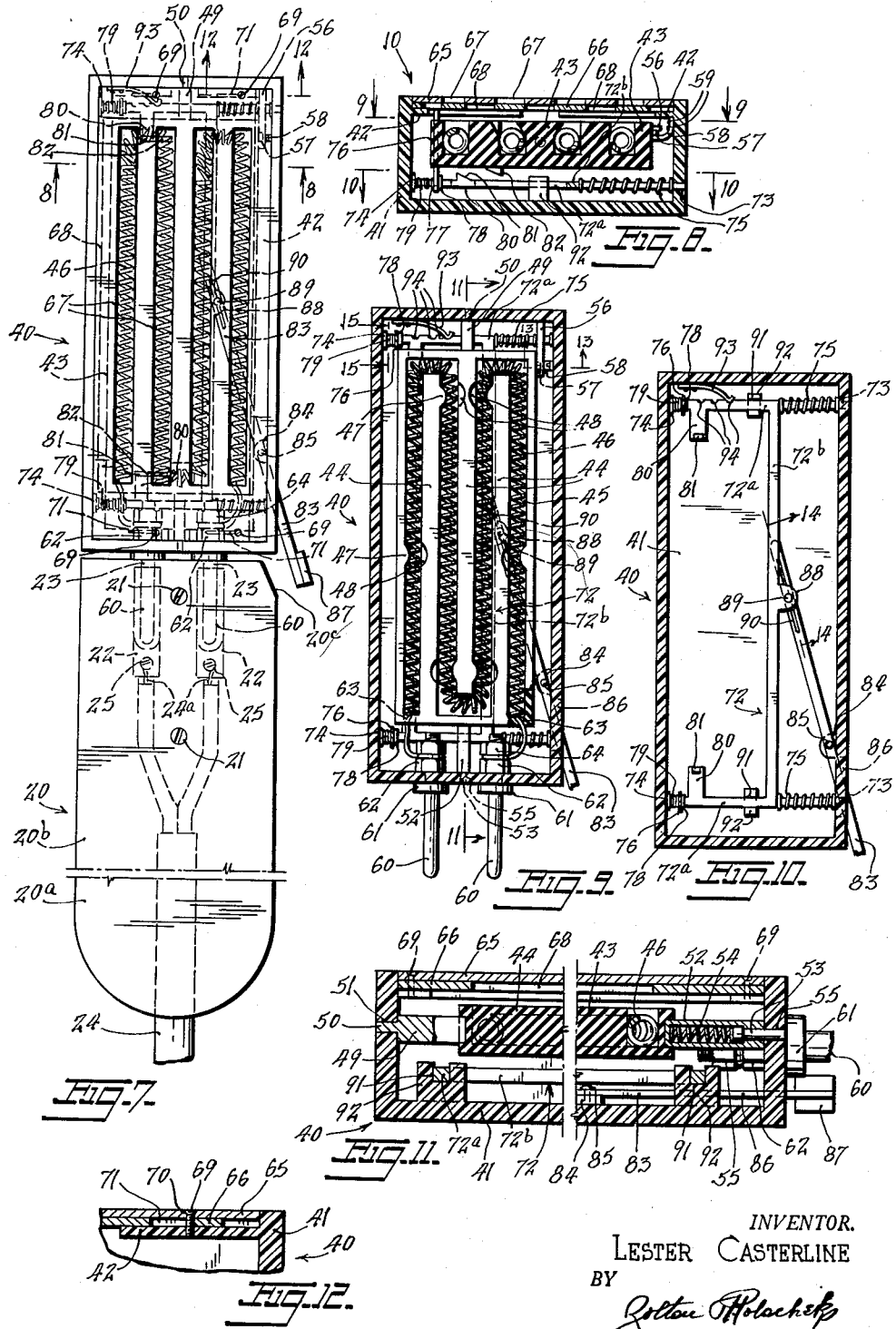
INVENTOR.
LESTER CASTERLINE
BY
Zoltan Holschek
ATTORNEY Patented June 8, 1954

2,680,801

UNITED STATES PATENT OFFICE 2,680,801

POULTRY SINGE DEVICE

Lester Casterline, Flushing, N. Y.

Application November 28, 1951, Serial No. 258,719

9 Claims. (Cl. 219—29)

This invention relates to new and useful improvements in poultry singeing devices.

It is common practice to pass a completely plucked chicken, duck, turkey, goose or other poultry over on open flame of a gas stove or the like to burn away the minute feathers, hair and down which remain on the poultry after the larger feathers have been all plucked. Such practice has been found objectionable because the poultry is scorched if not moved rapidly enough and sometimes the hands of the person holding the poultry over the open flame are seriously burned if extreme care is not exercised to keep the parts of the hands out of the open flame.

The present invention proposes the construction of simple hand held electrically operated devices which can be used for burning away the minute feathers, hair and down which remain on a completely plucked chicken, duck, turkey, goose or other poultry, which devices will overcome the objections discussed in the paragraph above.

More specifically, the present invention proposes characterizing the poultry singeing devices by a handle arranged to be held in one hand and which has a pair of contact sockets connectable to a source of electric current exposed in one end thereof to be engaged by the contact prongs of a singeing member including a housing which mounts a resistance element which when energized will furnish the required heat to burn away the minute feathers, hair and down.

Another object of the present invention proposes arranging the contact prongs so that the mere act of inserting the prongs into the contact sockets will mount the singeing member in position on the handle and at the same time place the resistance element in series in the electric circuit to be energized.

Still further, the present invention proposes providing the hollow housing with an open side which exposes the resistance element so that as the housing is moved over the surface of the plucked poultry with the open side facing the poultry the minute feathers, hair and down which remain will be burned away.

The present invention further proposes a novel shutter arrangement for closing the open side of the housing in a manner to completely enclose the resistance element and prevent accidental contact of the fingers of the hands with the resistance element in the event the singeing device should be rested down with the current turned on.

A still further object of the present invention proposes mounting the resistance element on a pivotally mounted carrier within the hollow housing in a manner so that the carrier can be tilted if desired to move one side of the resistance element closer to the open side of the housing in a manner to more easily burn away any stubborn minute feathers, hair or down which might remain on the poultry.

Still another object of the present invention proposes providing the hollow housing with a single manually operable control for first moving the shutter to an open position and then pivoting the carrier if that should be desired.

It is a further object of the present invention to provide poultry singeing devices which are simple and durable, which are effective for their intended purposes and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

On the accompanying drawings forming a material part of the present disclosure:

Fig. 1 is a perspective view of a poultry singeing device constructed in accordance with the present invention.

Fig. 2 is an elevational view of the hollow housing per se looking at the open side thereof.

Fig. 3 is an enlarged transverse sectional view taken on the line 3—3 of Fig. 2.

Fig. 4 is an enlarged partial longitudinal sectional view taken on the line 4—4 of Fig. 2.

Fig. 5 is a partial perspective view of the end of the handle normally adjacent the hollow housing.

Fig. 6 is an elevational view of the handle with one-half thereof removed.

Fig. 7 is an elevational view of the poultry singeing device constructed in accordance with a modification of the present invention.

Fig. 8 is an enlarged transverse sectional view taken on the line 8—8 of Fig. 7.

Fig. 9 is a longitudinal sectional view of the hollow housing taken on the line 9—9 of Fig. 8.

Fig. 10 is a longitudinal sectional view of the hollow housing taken on the line 10—10 of Fig. 8.

Fig. 11 is an enlarged longitudinal sectional view taken on the line 11—11 of Fig. 9, but with the center portion thereof broken away.

Fig. 12 is an enlarged partial transverse sectional view taken on the line 12—12 of Fig. 7.

Fig. 13 is an enlarged partial transverse sectional view taken on the line 13—13 of Fig. 9.

Fig. 14 is an enlarged sectional view taken on the line 14—14 of Fig. 10.

Fig. 15 is an enlarged sectional view taken on the line 15—15 of Fig. 9.

The poultry singeing device, according to the first form of the invention shown in Figs. 1 to 6, includes a handle 20 molded of any desirable heat resistant, dielectric material and is comprised of two adjacent halves 20ª and 20ᵇ held in juxtaposition by a pair of nut and bolt assemblies 21 passed through suitable aligned holes formed in the halves of the handle 20. The adjacent faces of the halves 20ª and 20ᵇ of the handle 20 are suitably cavitated to mount adjacent one end thereof a spaced pair of contact sockets 22, see Fig. 6. The adjacent ends of the halves are formed with aligned semi-circular recesses which combine to form circular holes 23, see particularly Figs. 5 and 6, in alignment with the contact sockets 22. An electric cord 24 is extended into the handle 20 from the other end thereof and has bared ends 24ª secured to the contact sockets 22 by screws 25 as most clearly shown in Fig. 6. The outer end of the electric cord 24 is provided with the usual plug 26, see Fig. 1, for insertion into an electric outlet receptacle for supplying the required electric current to the singeing device.

Provided for use in connection with the handle 20, there is a singeing member 27 which is comprised of a hollow housing 28 which has one side open. The housing 28, as in the case of the handle 20, is molded of a heat resistant, dielectric material. It is preferred that the housing 28 be molded of porcelain but, if desired, any other similar heat resistant, dielectric material may be used.

The housing 28 is provided for being arranged in end alignment with the end of the handle 20 having the holes 23. Mounted through the end wall of the housing 28 adjacent the handle 20, there is a spaced pair of contact prongs 29 which are provided intermediate of their ends with collars 30 which abut the end of the housing 28. Internally, the contact prongs 29 are threaded and are fixed in position by means of nuts 31 threaded onto the inner ends of the contact prongs 29 and tightened against the inner face of the end wall of the housing 28. The spacing of the contact prongs 29 matches the spacing of the holes 23 and the act of inserting the outer ends of the contact prongs 29 through those holes and into the contact sockets 22 causes the housing 28 to be mounted in position on the end of the handle 20 and also causes the contact prongs 29 to make electrical contact with the contact sockets 22.

Internally, the hollow housing 28 is divided into a plurality of adjacent passages 32 by spaced walls 33 integrally molded with the housing 28. The center wall 33 extends from the end of the housing remote from the contact prongs 29 to a point spaced slightly from the end wall of the housing mounting the prongs. The outer walls 33 extend from a point adjacent to the end wall of the housing remote from the contact prongs 29 to a point spaced slightly from the end wall of the housing mounting the contact prongs, the same as the center wall 33. Positioned in the passages 32 serpentine fashion, there is an elongated resistance element 34 which has its two ends located adjacent the end wall of the hollow housing 28 which mounts the contact prongs 29. Those ends of the resistance element 34 are connected to the contact prongs 29 by means of nuts 35 which clamp the ends against the nuts 31, see Figs. 2 and 4.

For retaining the resistance element 34 in position within the passages 32, the walls 33 are formed with projections 36 which extend partially across the respective passages 32 locking the resistance element in position therein. The opposite walls of the respective passages 32 are formed with notches 37 which are aligned with the projections 36 and which permit the resistance element 34 to be forced into position in the passages 32 about the projections 36. The number of projections 36 and aligned notches 37 can be increased or decreased as may be necessary to retain the resistance element 34 fixedly in position in the passages 32.

The operation of the singeing device is as follows:

With the singeing member 27 mounted in position on the end of handle 20 as shown in Fig. 1, the plug 26 is inserted into the usual outlet receptacle to furnish electric current required to energize the resistance element 34. A sufficient time is allowed for the resistance element 34 to heat up and then while grasping the singeing device by the handle 20 the open side of the hollow housing 28 is passed over the surfaces of the plucked chicken, duck, turkey, goose or other poultry, so that the energized resistance element 34 will burn away the minute feathers, hair or down which remain on the poultry after all of the larger feathers have been plucked.

It is apparent that the present invention provides a singeing device which can be conveniently used in the home, but which is particularly well adapted for use by those commercial houses which prepare great numbers of poultry which are to be "quick frozen" and sold to the consumer as "completely cleaned, ready to prepare" poultry.

The modification of the invention shown in Figs. 7 to 15 is characterized by a modified form of singeing member 40 for use with the handle 20. The construction of the handle 20 is in all respects similar to that described in connection with Figs. 1 to 6 except that the corner 20ᶜ is cut away, as shown in Fig. 7, for a purpose which will become clear as the specification proceeds.

The singeing member 40 is characterized by a hollow housing 41 arranged in end alignment with the handle 20 and which has one side open. The housing 41 is molded of a heat resistant, dielectric material—preferably one of the synthetic resinous materials. However, the housing 41 can be made of metal, in which case suitable electric insulation will have to be provided for the protection of the electric circuit parts. Due to the fact that the synthetic resinous materials have a tendency to remain somewhat cooler than the metals they are preferred, and it is appreciated that a thermosetting resin will have to be used.

The housing 41 is formed internally and closely adjacent its open side with an inwardly directed circumferential flange 42. Positioned within the housing 41 internally of the flange 42 there is a pivotally mounted carrier 43 molded of a heat resistant, dielectric material—preferably porcelain. The carrier is integrally molded with spaced walls 44 which divide off a serpentine passage 45. The passage 45 opens on the side of the carrier 43 which faces the open side of the housing 41. Positioned in serpentine fashion within the serpentine passage 45, there is an elongated resistance element 46 which is to be energized electrically. The resistance element is fixedly maintained in position within the passage 45 by means of projections 47 formed on the walls 43 of the carrier. The projections 47 extend across the passage 45 in alignment with complementary recesses 48 formed in the opposed walls 44 so that the resistance element 46 can be forced into position in the passage 45 past the projections 47.

The carrier 43 is pivotally supported to swing on the longitudinal axis of the housing 41 so that the resistance element 46 at one side of the carrier 43 can be positioned closer to the open side of the housing 41 to more effectively burn away stubborn minute features, hair or down which remain on the surface of the poultry. The pivotal support comprises a fixed trunnion 49 mounted in one end of the carrier 43 and which has a reduced pin portion 50 which is rotatively positioned within a complementary hole 51 formed in the end wall of the hollow housing 41. At its other end and in axial alignment with the fixed trunnion 49, the carrier 43 is provided with a tubular trunnion 52 which slidably mounts a pin 53. The pin 53 is resiliently urged into an extended position by means of an expansion spring 54 contained within the tubular trunnion 52. The outer end of the spring urged pin 53 is turnably received within a hole 55 formed within the adjacent end wall of the housing 41, see Fig. 11.

The carrier 43 is retained in a pivoted position parallel with the open side of the housing 41 by a means best illustrated in Figs. 9 and 13. That means comprises an extension 56 of the end wall of the housing 41. Extending from the adjacent end of the carrier 43 there is a lug 57 which engages the end of the extension 56 from beneath, see Fig. 13. An arcuate leaf spring 58 has one end secured to the inner face of the adjacent side wall of the housing 41 by several spaced pins 59. The other end of the leaf spring 58 engages the lug 57 from beneath holding the same in position against the extension 56. The carrier 43 is never pivoted so that the free end of the lug 57 passes the free end of the leaf spring 58.

Mounted through the end wall of the housing 41 adjacent the handle 20, there are spaced contact prongs 60 which are formed intermediate of their ends with fixed collars 61 which engage the outer face of the respective end wall of the hollow housing 41. The inner ends of the contact prongs 60 are threaded and those prongs 60 are maintained in a fixed position with relation to the end wall of the housing 41 by means of nuts 62 threaded onto the inner ends of the contact prongs 60 and against the inner face of the end wall of the housing 41. Insertion of the outer ends of the contact prongs 60 into the holes 23 in the adjacent end of the handle 20 automatically mounts the housing 41 in position on the end of the handle and places the contact prongs 60 in electrical contact with the contact sockets 22.

The two ends of the resistance element 46 are located at the end of the carrier 43 located adjacent the inner ends of the contact prongs 60. That end of the carrier 43 is formed with spaced holes 63, see Fig. 9, through which the ends of the resistance element 46 are extended. In turn the extended ends of the resistance element 46 are secured to the inner ends of the contact prongs by means of nuts 64 which clamp the extended ends of the resistance element 46 against the nuts 62. In this modification of the invention, the extended ends of the resistance element 46 are covered with a heat resistant insulation material from the points where they pass from the holes 63 to the point where they are connected to the inner ends of the contact prongs 60.

A shutter is provided for closing the open side of the housing 41 to cover the resistance element 46 and prevent one's fingers from accidentally coming in contact therewith if the singeing device should be put down with the current on. The shutter comprises an outer fixed shutter plate 65 and an inner movable shutter plate 66 superimposed on the flange 42 with the outer face of the outer shutter plate 65 flush with the edges of the walls of the housing 41 defining the open side of the hollow housing, see Figs. 8 and 11. The outer shutter plate 65 is formed with longitudinally extended parallel slots 67 which are in alignment with the passages 45 of the carrier 43, which is best seen from Fig. 8. The inner shutter plate 66 which is of a width less than the width of the outer shutter plate 65 to provide clearance for shifting the inner shutter plate 66 laterally, is provided with longitudinally extended slots 68 which match the spacing of the slots 67 of the outer plate 65, but the slots 68 are normally out of alignment with the passages 45 of the carrier 43 and the slots 67, see Fig. 8. Shifting of the movable inner shutter plate 66 laterally to the right, as it is viewed in Fig. 8, will bring the slots 68 into alignment with the slots 67 permitting the heat to pass from the resistance element 46 to the exterior of the housing 41 to burn away the remaining minute feathers, hair, and down which remain on the plucked poultry.

The shutter plates 65 and 66 are retained in position by means of screws 69, see Fig. 12, which are passed through holes 70 formed in the outer shutter plate 65 through elongated slots 71 formed in the inner shutter plate 66 and then threaded into the flange 42. The flange 42 is cut away directly above the trunnions 49 and 52 of the carrier 43 so that the carrier can be mounted in position within the hollow housing 41 without obstruction from the flange. The screws 69 are threaded into the flange 42 on opposite sides of the cut away portion and the elongated slots 71 are extended laterally so that the inner movable shutter plate 66 will have freedom of lateral movement relative to the outer shutter plate 65. The screws 69 are not so tightened into position that they function to hold the inner shutter plate 66 against the desired movement.

A single manually operable means is provided for first moving the inner shutter plate 66 to a position in which its slots 68 will be aligned with the slots 67 of the outer shutter plate 65 and for then pivoting the carrier 43 against the holding action of the arcuate leaf spring 58. That means includes an H-shaped operator member 72 positioned within the housing 41 inward of the carrier 43, see Figs. 8 to 11. The operator member 72 has parallel end arms 72ª extended parallel to the end walls of the housing 41 and an integral cross piece 72ᵇ. Adjacent ends of the end arms 72ª of the operator member 72 are extended slidably through complementary openings 73 formed in the adjacent side wall of the housing 41, see particularly Fig. 8. The other ends of the end arms 72ª are formed with enlarged heads 74. Expansion coil springs 75 positioned on the end arms 72ª, operate between the adjacent faces of the cross piece 72ᵇ and the side wall of the housing 41 having the openings 73 urging the operator member 72 into an inoperative position in which the enlarged heads 74 will be abutted against the inner face of the opposite side wall of the housing 41.

Extending from the inner face of the movable inner shutter plate 66 in alignment with the end arms 72ª of the operator member 72, there are inwardly directed extensions 76 which have slots 77 extended in from their free inner ends, see Fig. 15, so that those inner ends of the extensions 76 will straddle the end arms 72ª at points spaced slightly from the enlarged heads 74. On the sides of the extensions 76 facing away from the enlarged heads 74, each of the end arms 72ª is formed with an enlarged collar 78. A short expansion spring 79 is engaged on each of the end arms 72ª and operates between the adjacent faces of the extension 76 and the enlarged collar 74 holding the extension 76 in position against the respective collar 78. The expansion springs 79 function when the H-shaped operator member 72 is first moved against the action of the springs 75 to cause the movable inner shutter plate 66 to be moved to align its slots 68 with the slots 67 of the outer fixed shutter plate 65. When lateral movement of the movable inner shutter plate 66 is arrested, by engagement of the right side of the shutter plate 66, as viewed in Fig. 8, against the inner face if the right side wall of the housing 41; a position in which the slots 67 and 68 are in alignment—the operator member 72 is still free for further movement against the action of the springs 75 with such further movement acting to compress the springs 79.

That further movement of the operator member 72 which causes compression of the spring 79 is then used for pivoting the carrier 43 against the action of the arcuate leaf spring 58. To accomplish that pivoting, the end arms 72ª of the operator member 72 are formed with inwardly directed extensions 80 which are in end alignment with each other and which are located between the collars 78 and the cross piece 72b. The inner ends of the extensions 80 are formed with cams 81, see particularly Fig. 8, which are extended toward the inner face of the carrier 43. The inner face of the carrier 43 on the side of the trunnions 49 and 52 opposed to the side where the spring 58 is located, is formed with complementary cams 82 in lateral alignment with the cams 81. During movement of the operator member 72 which causes compression of the expansion springs 79, the cams 81 will ride under the cams 82 and pivot the carrier 43 against the action of the spring 58. Movement of the operator member 72, under the influence of its springs 75, to move the cams 81 out of contact with the cams 82 will free the carrier 43 to be pivoted back to its starting position by the spring 58. During the time that the carrier 43 is pivoted, the resistance element 46 at one side of the carrier 43 will be moved closer to the inner shutter plate 66 making greater heat available for burning away stubborn minute feathers, hair and down which remain on the surfaces of the poultry.

A single lever 83 is pivoted intermediate of its ends on a boss 84 formed within the housing 41 by means of a pin 85. One end of the lever 83 is extended through an elongated slot 86 formed in the side of the housing 41. That outer end of the lever 83 is formed with an enlarged pad 87 against which one's finger can be rested for pivoting the lever. The corner 20ᶜ of the handle 20 is cut away, as previously referred to, to provide the necessary clearance for pivoting the lever 83.

Intermediate of its ends, the cross piece 72b of the operator member 72 is formed with an enlargement 88 which carries a fixed pin 89 which in turn engages an elongated slot 90, see particularly Fig. 14, formed in the inner end of the lever 83. Thus, when the lever 83 is pivoted about its pin 85 the H-shaped operator member 72 will be moved laterally against the action of the spring 75. The ends of the end arm 72ª of the operator member 72 on the side of the cross piece 72b engaged by the springs 75, are supported for horizontal sliding movement by being rested down in grooves 91 formed in complementary supporting brackets 92. The brackets 92 are formed integrally with the material of the hollow housing 41. The end arms 72ª of the operator member 72 are retained in position within the grooves 91 by means of the extensions 76 of the inner shutter plate 66.

Provided internally there is a mechanism for making a "clicking" sound to indicate when the operator member 72 has been first moved a sufficient distance to align the slots 67 and 68 and when the carrier 43 is in its pivoted position. That mechanism comprises a leaf spring 93 which has one end secured to the end wall of the housing 41 by several pins. The other end of the leaf spring 93 is bent to engage complementary notches 94 formed in the outer side of the respective end arm 72ª of the operator member 72, see Fig. 9.

Basically the manner of using the modified singeing device of Figs. 7 to 15 is the same as that described for Figs. 1 to 6. However, the open side of the housing 41 of the modified device is closed by the shutter plates 65 and 66. To open that shutter to permit the device to be used, the lever 83 must first be pivoted until the spring clicks into the next notch 94. The lever 83 by finger pressure is held in that position and the device used for burning away the minute feathers, hair and down as described in connection with the first form of the invention. If certain of the feathers, hair or down are stubborn to remove, the lever 83 can be further pivoted until the spring 93 clicks into the next notch 94 causing the carrier 43 to be pivoted against the action of the spring 58 to move one side of the resistance element 46 closer to the open side of the housing 41 to more effectively burn away the stubborn minute feathers, hair and down. When the finger pressure on the lever 83 is released, the springs 75 will immediately move the operator member 72 back to its starting position releasing the carrier 43 to be pivoted back to its starting position by the spring 58 and moving the inner shutter plate 66 back to its closed position. Thus, the resistance element 46 is completely enclosed except at such times when finger pressure is applied to the outer end of the lever 83 pivoting the same. This prevents the fingers of the hand from coming accidentally in contact with the hot resistance element if the singeing device is placed down with the current turned on.

It is appreciated, that the spring 93 could be duplicated at the other end of the operator member 72 with those springs being made strong enough to overcome the action of the springs 75 and so hold the operator member 72 in any one of its shifted positions. However, it is preferred that the springs 93 be merely used for producing the clicking sounds to indicate the desired positions of the operator member 72. Also, with the springs 93 functioning to hold the operator member 72, the springs 75 could be completely eliminated, if desired.

While I have illustrated and described the preferred embodiments of my invention, it is to be understood that I do not limit myself to the precise method herein disclosed and the right is reserved to all changes and modifications coming within the scope of the invention as defined in the appended claims.

Having thus described my invention, what I claim as new and desire to secure by United States Letters Patent is:

1. A poultry singeing device comprising a handle containing a pair of spaced contact sockets exposed at one end of said handle, a hollow housing arranged in end alignment with the said one end of said handle, said housing having an open side for engagement against the poultry being singed, spaced contact springs mounted through the end wall of said housing adjacent the said one end of said handle for insertion into said contact sockets, and an elongated resistance element positioned within said hollow housing and having its ends connected to said contact prongs, and a carrier pivotally mounted within said housing and adapted to pivot on an axis extended longitudinally of said housing, said carrier having an open side facing and in spaced parallel relation to the open side of said housing, means for pivoting the carrier, and spaced longitudinally extending walls formed in said carrier dividing off a serpentine passage in which said resistance element is positioned.

2. A poultry singeing device comprising a handle containing a pair of spaced contact sockets exposed at one end of said handle, a hollow housing arranged in end alignment with the said one end of said handle, said housing having an open side for engagement against the poultry being singed, spaced contact springs mounted through the end wall of said housing adjacent the said one end of said handle for insertion into said contact sockets, and an elongated resistance element positioned within said hollow housing and having its ends connected to said contact prongs, and a carrier pivotally mounted within said housing and adapted to pivot on an axis extended longitudinally of said housing, means for pivoting the carrier, said carrier having an open side facing the open side of said housing, and spaced longitudinally extending walls formed in said carrier dividing off a serpentine passage in which said resistance element is positioned, and projections formed on certain of said walls and extended partially across said passages holding said resistance element in position in said passage.

3. A poultry singeing device comprising a handle containing a pair of spaced contact sockets exposed at one end of said handle, a hollow housing arranged in end alignment with the said one end of said handle, said housing having an open side for engagement against the poultry being singed, spaced contact springs mounted through the end wall of said housing adjacent the said one end of said handle for insertion into said contact sockets, and an elongated resistance element positioned within said hollow housing and having its ends connected to said contact prongs, and a shutter closing the open side of said housing, and a carrier pivotally mounted within said housing and adapted to pivot on an axis extended longitudinally of said housing, said carrier having an open side facing the open side of said housing, and spaced longitudinally extending walls formed in said carrier dividing off a serpentine passage in which said resistance element is positioned, and manually movable control means operable on a first movement thereof to open said shutter and upon a further movement thereof to pivot said carrier.

4. A poultry singeing device comprising a handle containing a pair of spaced contact sockets exposed at one end of said handle, a hollow housing arranged in end alignment with the said one end of said handle, said housing having an open side for engagement against the poultry being singed, spaced contact springs mounted through the end wall of said housing adjacent the said one end of said handle for insertion into said contact sockets, and an elongated resistance element positioned within said hollow housing and having its ends connected to said contact prongs, and a shutter closing the open side of said housing, and a carrier pivotally mounted within said housing and adapted to pivot on an axis extended longitudinally of said housing, said carrier having an open side facing the open side of said housing, and spaced longitudinally extending walls formed in said carrier dividing off a serpentine passage in which said resistance element is positioned, said shutter comprising superimposed shutter plates closing the open side of said housing, one of said shutteer plates being fixed and having elongated slots aligned with the passage of said carrier and the other of said shutter plates being movable and having spaced slots normally out of alignment with the slots of said fixed shutter plate and manually movable control means operable on a first movement to move said movable shuttter plates and upon a further movement to pivot said carrier.

5. A poultry singeing device comprising a handle containing a pair of spaced contact sockets exposed at one end of said handle, a hollow housing arranged in end alignment with the said one end of said handle, said housing having an open side for engagement against the poultry being singed, spaced contact springs mounted through the end wall of said housing adjacent the said one end of said handle for insertion into said contact sockets, and an elongated resistance element positioned within said hollow housing and having its ends connected to said contact prongs, and a shutter closing the open side of said housing, and a carrier pivotally mounted within said housing and adapted to pivot on an axis extended longitudinally of said housing, said carrier having an open side facing the open side of said housing, and spaced longitudinally extending walls formed in said carrier dividing off a serpentine passage in which said resistance element is positioned, said shutter comprising superimposed shutter plates closing the open side of said housing, one of said shutter plates being fixed and having elongated slots aligned with the passage of said carrier and the other of said shutter plates being movable and having spaced slots normally out of alignment with the slots of said fixed shutter plate, said movable shutter being positioned inward of said fixed shutter and having inwardly extended extensions and manually movable control means engaged with said extensions and including camming means cooperable with said carrier whereby upon a first movement of said control means said movable shutter is moved to align the slots of said shutter plates and upon a further movement of the control means the carrier is caused by said camming means to pivot.

6. A poultry singeing device comprising a handle containing a pair of spaced contact sockets exposed at one end of said handle, a hollow housing arranged in end alignment with the said one end of said handle, said housing having an open side for engagement against the poultry being singed, spaced contact springs mounted through the end wall of said housing adjacent the said one end of said handle for insertion into said contact sockets, and an elongated resistance element positioned within said hollow housing and having its ends connected to said contact prongs, and a carrier pivotally mounted within said housing and adapted to pivot on an axis extended longitudinally of said housing, said carrier having an open side facing the open side of said housing, and spaced longitudinally extending walls formed in said carrier dividing off a serpentine passage in which said resistance element is positioned, and means including a slidably supported spring urged H-shaped operator member and a pivotally mounted manually operable lever for moving said operator member against the action of its springs, said member having cams, and complementary cams mounted on said carrier for engagement by said first cams for pivoting the same, upon operating said lever.

7. A poultry singeing device comprising a handle containing a pair of spaced contact sockets exposed at one end of said handle, a hollow housing arranged in end alignment with the said one end of said handle, said housing having an open side for engagement against the poultry being singed, spaced contact springs mounted through the end wall of said housing adjacent the said one end of said handle for insertion into said contact sockets, and an elongated resistance element positioned within said hollow housing and having its ends connected to said contact prongs, and a shutter closing the open side of said housing, and a carrier pivotally mounted within said housing and adapted to pivot on an axis extended longitudinally of said housing, said carrier having an open side facing the open side of said housing, and spaced longitudinally extending walls formed in said carrier dividing off a serpentine passage in which said resistance element is positioned, control means having a first and second movement and adapted upon the first movement thereof to open said shutter and upon the second movement thereof to pivot said carrier, means connecting said control means to said shutter and cam means on the control means engageable with complementary cam means on the carrier, and spring means audibly operable by said control means upon each movement of the latter.

8. A poultry singeing device comprising a handle containing a pair of spaced contact sockets exposed at one end of said handle, a hollow housing arranged in end alignment with the said one end of said handle, said housing having an open side for engagement against the poultry being singed, spaced contact springs mounted through the end wall of said housing adjacent the said one end of said handle for insertion into said contact sockets, and an elongated resistance element positioned within said hollow housing and having its ends connected to said contact prongs, and a carrier pivotally mounted within said housing and adapted to pivot on an axis extended longitudinally of said housing, said carrier having an open side facing the open side of said housing, and spaced longitudinally extending walls formed in said carrier dividing off a serpentine passage in which said resistance element is positioned, and trunnions extending from the ends of said carrier in end alignment with each other, and pins extending from the outer ends of said trunnions and engaging complementary holes formed in the end walls of said housing.

9. A poultry singeing device comprising a handle containing a pair of spaced contact sockets exposed at one end of said handle, a hollow housing arranged in end alignment with the said one end of said handle, said housing having an open side for engagement against the poultry being singed, spaced contact springs mounted through the end wall of said housing adjacent the said one end of said handle for insertion into said contact sockets, and an elongated resistance element positioned within said hollow housing and having its ends connected to said contact prongs, and a carrier pivotally mounted within said housing and adapted to pivot on an axis extended longitudinally of said housing, said carrier having an open side facing the open side of said housing, and spaced longitudinally extending walls formed in said carrier dividing off a serpentine passage in which said resistance element is positioned, and trunnions extending from the ends of said carrier in end alignment with each other, and pins extending from the outer ends of said trunnions and engaging complementary holes formed in the end walls of said housing, the pin of one of said trunnions being resiliently mounted to be pushed inward for disengagement from its respective hole of said housing freeing said carrier to be removed.

References Cited in the file of this patent

UNITED STATES PATENTS

| Number | Name | Date |
| --- | --- | --- |
| 734,353 | Nettleton et al. | July 21, 1903 |
| 1,013,327 | Smith | Jan. 2, 1912 |
| 1,523,626 | Armstrong | Jan. 20, 1925 |
| 1,534,689 | Cooper | Apr. 21, 1925 |
| 1,720,512 | Cuffe | July 9, 1929 |
| 1,881,262 | Conradty | Oct. 4, 1932 |

FOREIGN PATENTS

| Number | Country | Date |
| --- | --- | --- |
| 124,805 | Switzerland | Mar. 1, 1928 |
| 225,016 | Switzerland | June 1, 1943 |